US006203041B1

(12) United States Patent
Helm

(10) Patent No.: US 6,203,041 B1
(45) Date of Patent: Mar. 20, 2001

(54) INCLINE ANTI-ROLLBACK SYSTEM FOR WHEELCHAIRS

(76) Inventor: Hulbert Robertson Helm, Route 2, Box 35, Comanche, TX (US) 76442

( * ) Notice: Subject to any disclaimer, the term of this patent is extended or adjusted under 35 U.S.C. 154(b) by 0 days.

(21) Appl. No.: 09/330,430

(22) Filed: Jun. 8, 1999

Related U.S. Application Data

(60) Provisional application No. 60/088,769, filed on Jun. 10, 1998.

(51) Int. Cl.[7] ........................ B62M 1/14

(52) U.S. Cl. ........................ 280/250.1; 280/304.1; 280/238; 192/41 A; 192/43

(58) Field of Search ........................ 280/250.1, 246, 280/243, 255, 237, 238, 304.1; 192/41 R, 43, 43.2, 41 A, 64; 180/30, 6; 297/DIG. 4

(56) References Cited

U.S. PATENT DOCUMENTS

| | | | | |
|---|---|---|---|---|
| 4,462,605 | | 7/1984 | Morgan et al. | 280/242 WC |
| 4,538,825 | | 9/1985 | Delahoussaye et al. | 280/242 WC |
| 4,560,033 | | 12/1985 | DeWoody et al. | 182/2 F |
| 4,702,486 | * | 10/1987 | Tsuchie | 280/255 |
| 4,727,965 | * | 3/1988 | Zach et al. | 280/250.1 |
| 4,766,772 | * | 8/1988 | Tsuchie | 280/255 |
| 4,887,830 | | 12/1989 | Rought et al. | 280/304.1 |
| 4,987,978 | | 1/1991 | Jungersen | 188/2 F |
| 5,197,750 | | 3/1993 | DiGeorge | 280/250.1 |
| 5,301,971 | * | 4/1994 | Brereton et al. | 280/250.1 |
| 5,362,081 | * | 11/1994 | Beidler et al. | 280/250.1 |
| 5,401,044 | * | 3/1995 | Galumbeck | 280/250.1 |
| 5,486,016 | * | 1/1996 | Godin et al. | 280/250.1 |
| 5,746,437 | * | 5/1998 | Faber | 280/250.1 |

FOREIGN PATENT DOCUMENTS

| | | | | |
|---|---|---|---|---|
| 6165799 | * | 6/1994 | (JP) | 280/250.1 |

* cited by examiner

*Primary Examiner*—Daniel G. DePumpo
(74) *Attorney, Agent, or Firm*—William E. Hein

(57) ABSTRACT

An anti-rollback system allows wheelchair users the freedom of travelling up and down inclines without enlisting the assistance of others to do so and includes a pair of non-rotatable axles fixed to the frame of a wheelchair, a pair of wheel hubs, each of which includes two sprags or one-way clutches mounted in opposing rotational directions therein, and a shifting mechanism for selectively engaging either or neither sprag with the associated axle. The user may thereby select normal free-wheeling operation of the wheelchair or anti-rollback in either the forward or reverse direction.

3 Claims, 5 Drawing Sheets

INCLINE ANTI-ROLLBACK SYSTEM FOR WHEELCHAIRS

REFERENCE TO RELATED APPLICATION

This application claims the benefit of U.S. Provisional Application Ser. No. 60/088,769 filed Jun. 10, 1998.

BACKGROUND AND SUMMARY OF THE INVENTION

This invention relates generally to wheelchairs and, more particularly, to an anti-rollback system which acts to prevent bi-directional rollback of manually operated wheelchairs when positioned on inclines.

Many people who use wheelchairs experience difficulty when negotiating inclines and ramps because of the gravitational forces acting on the wheelchair when the user releases his or her grip on the propulsion ring while repositioning the hands for the next thrust of motion.

The present invention provides an anti-rollback system that allows wheelchair users the freedom of travelling up and down inclines without enlisting the assistance of others to do so. The anti-rollback system of the present invention includes a pair of non-rotatable axles fixed to the frame of a wheelchair, a pair of wheel hubs, each of which includes two sprags or one-way clutches mounted in opposing rotational directions therein, and a means for selectively engaging either or neither sprag with the associated axle. The user may thereby select normal operation of the wheelchair or anti-rollback in either the forward or reverse direction.

DESCRIPTION OF THE PREFERRED EMBODIMENT

Figure 1:
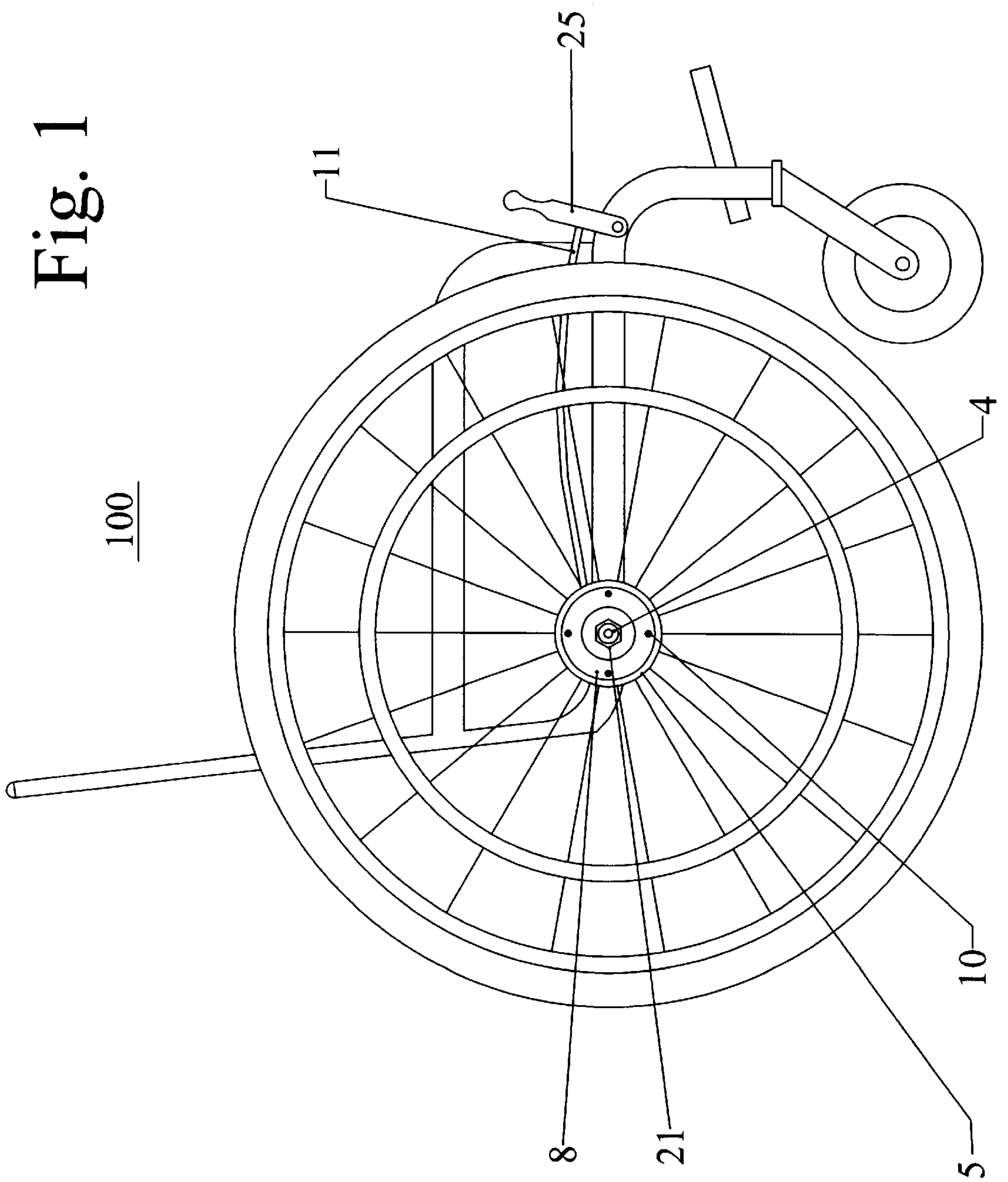
FIG. 1 is a general pictorial diagram illustrating a conventional wheelchair equipped with the incline anti-rollback system of the present invention.
Figure 2:
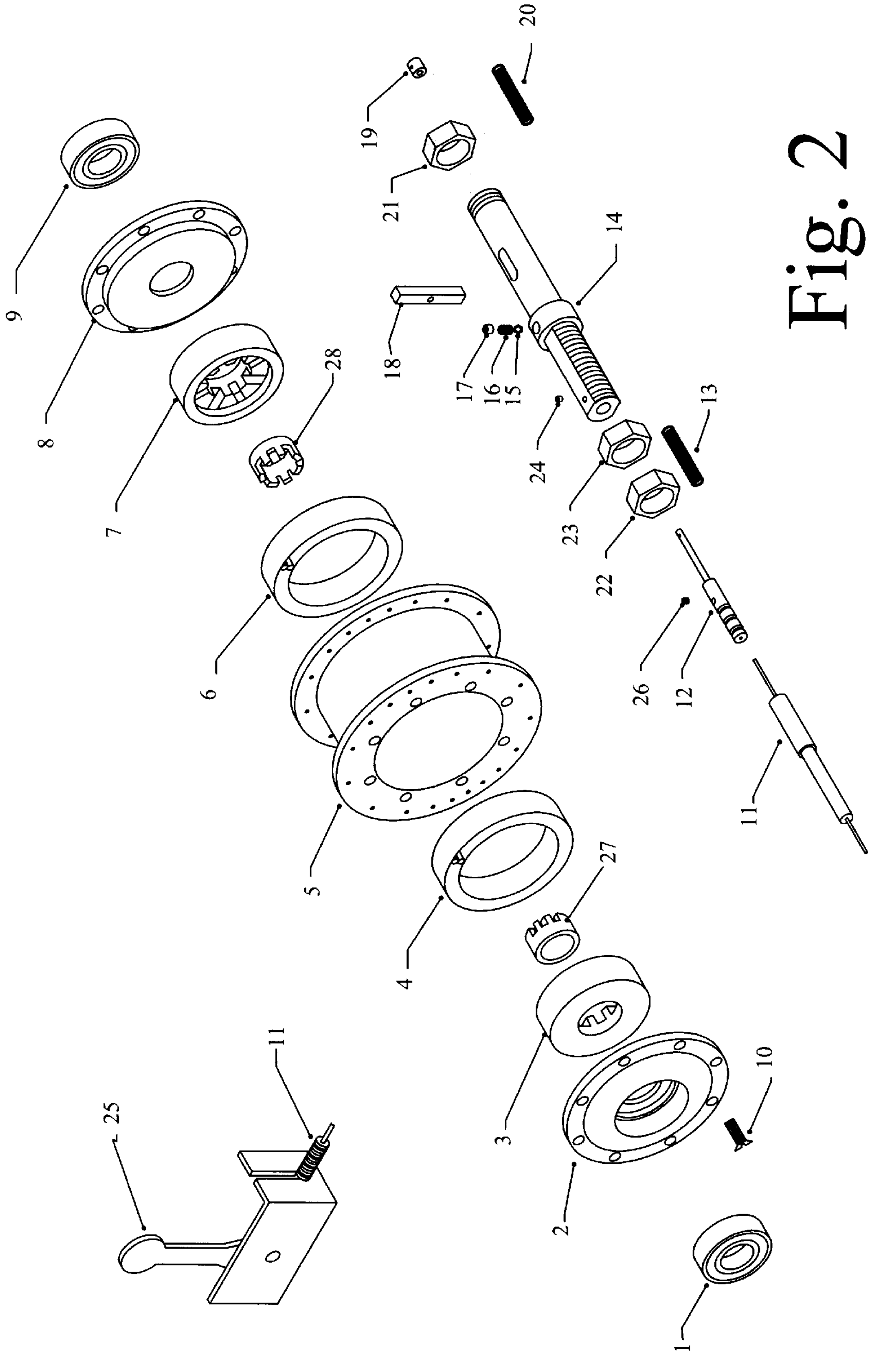
FIG. 2 is an exploded view of one of the wheel hub assemblies and its associated shifiting mechanism employed in the incline anti-rollback system of the present invention.

Referring now to FIGS. 1 and 2, there is shown a conventional wheelchair 100 equipped with the incline anti-rollback system of the present invention. A hollow axle 14 is non-rotatably secured to the frame of wheelchair 100 by means of a pair of nuts 22, 23. A hub 5 is coaxially mounted about axle 14 and includes a multiplicity of holes around the periphery of inner and outer flanges thereof through which the spokes of one of the main wheels of wheelchair 100 are conventionally attached. Two sprags or one-way clutches 4, 6 are mounted in opposite rotational directions within hub 5, which serves as an outer reaction ring for the two sprags 4, 6. Sprag 4 reacts on a sprag center 3 that is mounted coaxially over axle 14 with a bushing 27 to reduce friction. Similarly, sprag 6 reacts on sprag center 7 that is mounted coaxially over axle 14 with bushing 28.

Hub 5 is supported on axle 14 by means of hub supports 2, 8 that are secured to hub 5 with a plurality of fastener screws 10. Hub supports 2 and 8 contain bearings 1 and 9 and are retained to axle 14 by means of a retaining nut 21. A shift rod 12 fits into a central opening in axle 14. A pair of springs 13, 20 are positioned coaxially over a smaller portion of shift rod 12 and are retained by means of a spring retainer 19. A shift lug 18 is positioned over shift rod 12, sandwiched between springs 13, 20, and inserted in a slot in axle 14. An outer housing of a shift cable 11 is secured to axle 14 by way of a set screw 24 to provide a means for adjusting the position of shift rod 12. An inner wire of shift cable 11 is connected to shift rod 12 by way of a set screw 26. A distal end of shift cable 11 is connected to a shift lever 25 that may be mounted at a location on the frame of wheelchair 100 convenient to the user.

Figure 3:
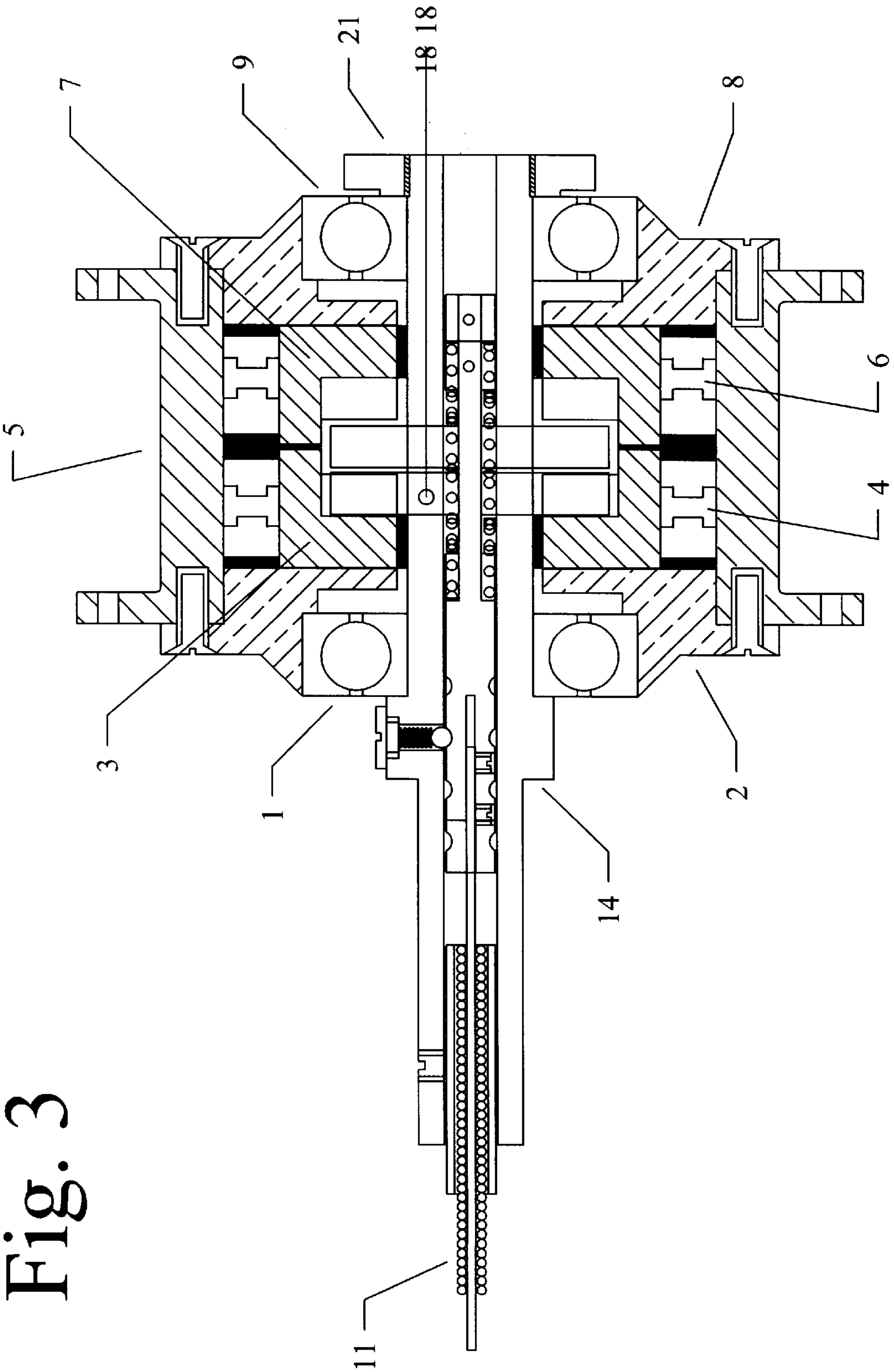
FIG. 3 is a cross-sectional diagram illustrating one of the wheel hub assemblies of the present invention after being shifted into the forward postion.
Figure 4:
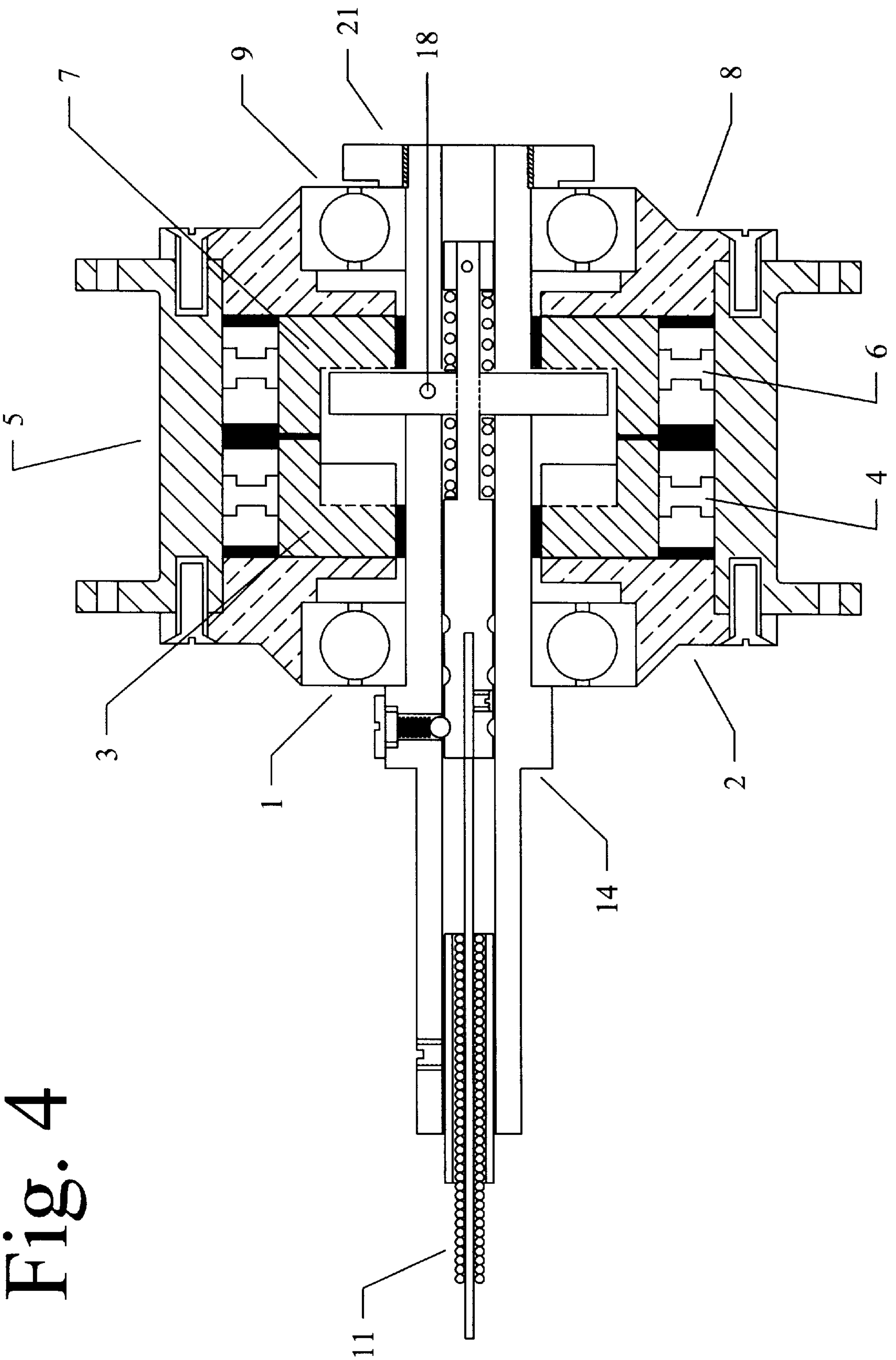
FIG. 4 is a cross-sectional diagram illustrating one of the wheel hub assemblies of the present invention after being shifted into the reverse position.
Figure 5:
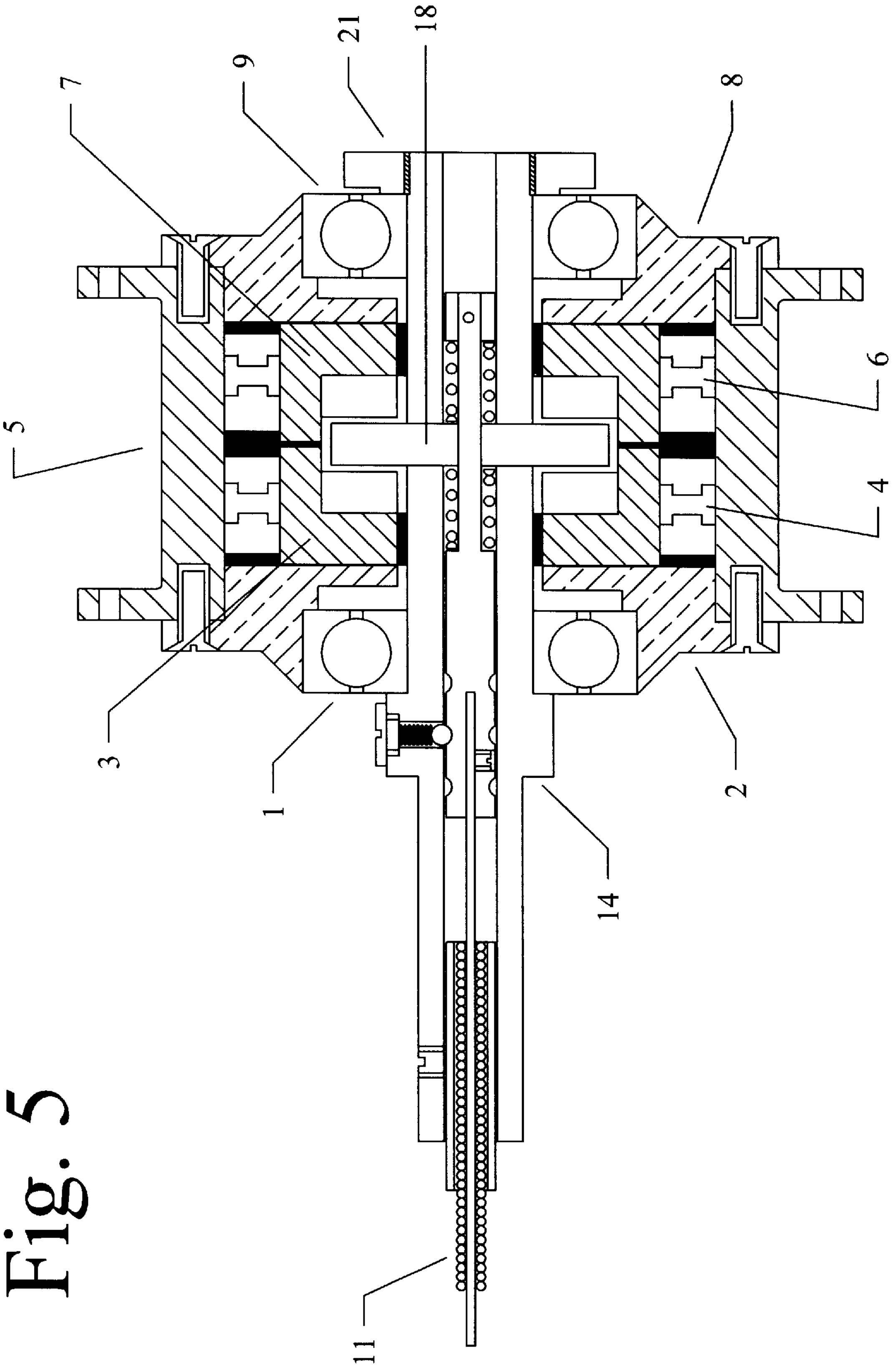
FIG. 5 is a cross-sectional diagram illustrating one of the wheel hub assemblies of the present invention in the neutral position.

Sprag centers 3 and 7 are slotted to receive shift lug 18 to thereby provide a means for selectively engaging either sprag center 3 or 7 with axle 14. The position of shift rod 12 is lightly held with pressure from a detent spring 16 on a detent ball 15. Detent spring 16 is secured within axle 14 by means of a screw-plug 17. As may be understood with reference to FIG. 3, when shift cable 11 is actuated by shift lever 25 to engage shift lug 18 within sprag center 3, rotation of hub 5 in one direction is prevented by sprag 4. As may be similarly understood with reference to FIG. 4, when shift cable 11 is actuated by shift lever 25 to engage shift lug 18 within sprag center 7, rotation of hub 5 in the opposite direction is prevented by sprag 6. When shift cable 11 is actuated by shift lever to the neutral position illustrated in FIG. 5 such that shift lug 18 is not engaged with either of sprag centers 3 or 7, hub 5 may freely rotate in either direction.

It should be understood that hub 5 and the structure associated therewith depicted in FIG. 2 and described in detail above in connection with one main wheel of wheelchair 100 is duplicated in connection with the other main wheel. Thus, the user may independently control the forward and reverse braking action of each of the main wheels of wheelchair 100 when negotiating an incline. Alternatively, he may choose to leave either or both of the main wheels in the neutral or freewheeling position.

I claim:

1. A wheelchair employing an incline anti-rollback device associated with each of two main wheels of the wheelchair for enabling a user to selectively and independently prevent forward or reverse rotation of either of two main wheels and to alternatively selectively and independently permit freewheeling rotation of either of those two main wheels, each of the anti-rollback devices comprising:

- a hollow cylindrical axle fixedly mounted to a frame of the wheelchair proximate one of the main wheels, the axle having two diametrically opposed slots longitudinally positioned in a central area of the axle;
- a wheel hub coaxially positioned over the central area of the axle and supporting one of the main wheels for rotation;
- a pair of sprag assemblies mounted over the axle within the wheel hub in opposing rotational relationship to each other such that an outer cylindrical surface of each of said sprag assemblies reacts against an adjacent inner surface of said wheel hub;
- a pair of hub supports fixedly mounted on inner and outer flanges of said wheel hub to coaxially support said wheel hub over the axle;
- a shift lug diametrically positioned for longitudinal motion within the two slots in the axle;

a shift cable, one end of which is positioned within said axle and fixedly attached to said shift lug; and a shift lever fixedly mounted to a frame member of said wheelchair within reach of the user, the other end of said shift cable being attached to said shift lever, the shift lever being actuable by the user for moving the shift lug to a neutral position between said pair of sprag assemblies to permit the associated main wheel to rotate freely in either direction, for moving the shift lug to a position of engagement with one of said sprag assemblies to permit said main wheel to rotate freely in a first direction but to prevent rotation thereof in a second opposite direction, and for moving the shift lug to a position of engagement with the other one of said sprag assemblies assembly to permit said main wheel to rotate freely in said second direction but to prevent rotation thereof in said first direction.

2. A wheelchair as in claim 1 wherein each of said sprag assemblies comprises an outer sprag member that reacts agains said cylindrical inner surface of said wheel hub and an inner sprag center for engagement by said shift lug.

3. A wheelchair as in claim 1 further comprising a bearing mounted within each of said hub supports for rotational supporting the hub supports on said axle.

* * * * *